United States Patent
Hattori et al.

(10) Patent No.: US 11,418,136 B2
(45) Date of Patent: Aug. 16, 2022

(54) ELECTRIC COMPRESSOR, MOTOR CONTROL METHOD, AND NON-TRANSITORY COMPUTER-READABLE MEDIUM

(71) Applicant: MITSUBISHI HEAVY INDUSTRIES THERMAL SYSTEMS, LTD., Tokyo (JP)

(72) Inventors: Makoto Hattori, Tokyo (JP); Takayuki Takashige, Tokyo (JP); Kyohei Watanabe, Tokyo (JP)

(73) Assignee: MITSUBISHI HEAVY INDUSTRIES THERMAL SYSTEMS, LTD., Tokyo (JP)

( * ) Notice: Subject to any disclaimer, the term of this patent is extended or adjusted under 35 U.S.C. 154(b) by 55 days.

(21) Appl. No.: 16/763,154

(22) PCT Filed: Oct. 24, 2018

(86) PCT No.: PCT/JP2018/039425
§ 371 (c)(1),
(2) Date: May 11, 2020

(87) PCT Pub. No.: WO2019/097965
PCT Pub. Date: May 23, 2019

(65) Prior Publication Data
US 2020/0313582 A1    Oct. 1, 2020

(30) Foreign Application Priority Data
Nov. 20, 2017  (JP) .............................. JP2017-222638

(51) Int. Cl.
*H02P 6/06*    (2006.01)
*B60H 1/00*    (2006.01)
*F04D 27/00*   (2006.01)

(52) U.S. Cl.
CPC ............ *H02P 6/06* (2013.01); *B60H 1/00428* (2013.01); *F04D 27/004* (2013.01)

(58) Field of Classification Search
CPC ........ H02P 6/06; H02P 23/02; B60H 1/00428; F04D 27/004
See application file for complete search history.

(56) References Cited

U.S. PATENT DOCUMENTS 6,526,772 B2 * 3/2003 Suitou ..................... F04B 49/02
                                                          62/228.4
2002/0088241 A1   7/2002 Suitou et al.
(Continued)

FOREIGN PATENT DOCUMENTS

DE    102 00 378 A1    9/2002
JP    6-225588 A       8/1994
(Continued)

OTHER PUBLICATIONS

International Search Report dated Jan. 22, 2019, for International Application No. PCT/JP2018/039425, with English translation.
(Continued)

*Primary Examiner* — Rina I Duda
(74) *Attorney, Agent, or Firm* — Birch, Stewart, Kolasch & Birch, LLP.

(57) ABSTRACT

A motor control device provided with a control unit which controls the number of rotations of a motor by implementing a first control which enables high-torque and precise control, or a second control enabling more efficient control than the first control with respect to the motor; and a switching determination unit which, if an actual measurement value of the number of rotations of the motor is greater than a prescribed threshold value of the number of rotations, switches the first control to the second control. The switching determination unit further switches the first control to the second control if the actual measurement value of the (Continued)

number of rotations is not more than the threshold value of the number of rotations, and when a prescribed time has passed from a point in time at which the actual measurement value of the number of rotations matched the required number of rotations.

12 Claims, 6 Drawing Sheets

(56) References Cited

U.S. PATENT DOCUMENTS

| | | | |
|---|---|---|---|
| 2007/0046249 A1 | 3/2007 | Tomigashi et al. | |
| 2012/0221197 A1* | 8/2012 | Hisada | B60L 3/0061 701/36 |
| 2013/0002178 A1 | 1/2013 | Endou et al. | |
| 2015/0311845 A1* | 10/2015 | Nagata | H02P 21/26 318/400.02 |
| 2018/0208023 A1 | 7/2018 | Kashima et al. | |

FOREIGN PATENT DOCUMENTS

| | | |
|---|---|---|
| JP | 9-238031 A | 9/1997 |
| JP | 2000-50686 A | 2/2000 |
| JP | 2003-102193 A | 4/2003 |
| JP | 2005-73104 A | 3/2005 |
| JP | 2005-168196 A | 6/2005 |
| JP | 2007-259686 A | 10/2007 |
| JP | 2007-282319 A | 10/2007 |
| JP | 2013-34364 A | 2/2013 |
| JP | 2013-238682 A | 11/2013 |
| WO | WO 2017/022083 A1 | 9/2017 |

OTHER PUBLICATIONS

Written Opinion of the International Searching Authority dated Jan. 22, 2019, for International Application No. PCT/JP2018/039425, with English translation.

* cited by examiner

ELECTRIC COMPRESSOR, MOTOR CONTROL METHOD, AND NON-TRANSITORY COMPUTER-READABLE MEDIUM

TECHNICAL FIELD

The present invention relates to a motor control device, an electric compressor including the same, a vehicle air conditioner, a motor control method, and a motor control program.

Priority is claimed on Japanese Patent Application No. 2017-222638, filed on Nov. 20, 2017, the content of which is incorporated herein by reference.

BACKGROUND ART

One of configuration elements of a vehicle air conditioner mounted on a vehicle is an electric compressor. In general, a motor of the electric compressor is driven using AC power whose voltage and frequency are adjusted by an inverter that functions as a variable speed device. Therefore, in order to properly control the electric compressor, it is necessary to perform proper inverter control in accordance with a change in an operation request or a load fluctuation when the electric compressor is actuated or after the electric compressor is actuated.

PTL 1 discloses two types of motor control methods such as a control method that gives priority to accuracy in estimating a position of a magnet rotor and a control method that gives priority to silence, and a motor control device that defines switching conditions.

CITATION LIST

Patent Literature

[PTL 1] Japanese Unexamined Patent Application Publication No. 2003-102193

SUMMARY OF INVENTION

Technical Problem

Incidentally, depending on a use condition of the vehicle air conditioner, a high torque load state is continued for a long time, or a required rotation speed suddenly fluctuates. Due to the factors, in some cases, the motor of the electric compressor may be unintentionally stopped contrary to a command. One example is a malfunction. For example, due to the malfunction, a spike current is generated, and an abnormal current flows into a control circuit of the electric compressor, thereby causing a possibility that an electronic component on the circuit may be affected.

However, the compressor disclosed in PTL 1 has the following problems. That is, according to the control method and the switching method which are defined above, in a case of the above-described factors which lead to the malfunction, the motor cannot be prevented beforehand from being stopped. For this reason, depending on an operating condition, there is a concern that stopping the motor may interfere with a normal operation of the electronic component on the control circuit of the electric compressor or may give damage to the electronic component itself.

Therefore, the present invention aims to provide a motor control device, an electric compressor, a vehicle air conditioner, and a control method of the electric compressor which can solve the above-described problems.

Solution to Problem

An aspect according to the present invention adopts the following means in order to solve the above-described problems. That is, there is provided a motor control device including a control unit that controls a rotation speed of a motor in accordance with a required rotation speed by performing first control which enables precise control on the motor, or by performing second control which enables higher efficient control than the first control on the motor, and a switching determination unit that switches from the first control to the second control, in a case where a rotation speed measured value of the motor exceeds a prescribed rotation speed threshold value. The switching determination unit further switches from the first control to the second control, in a case where the rotation speed measured value is equal to or smaller than the rotation speed threshold value, and in a case where a prescribed time elapses from when the rotation speed measured value coincides with the required rotation speed.

According to this configuration, as an example, it is possible to prevent a malfunction when two types of motor control are switched therebetween when the motor of the electric compressor is actuated. For example, the first control is defined as control that has a weak point in a highly efficient and wide range operation although the control enables a high torque and highly precise operation. On the other hand, the second control is defined as control that enables the highly efficient and wide range operation although the control has the weak point in the high torque and highly precise operation. In this case, it is possible to relatively advance the point in time for switching from the first control to the second control. That is, even in a situation where the above-described factors of the malfunction (such as continuation of a high torque load state or a sudden fluctuation in the required rotation speed) may occur, the first control can proceed to the second control which enables a wider range operation without waiting for the rotation speed measured value of the motor to exceed the prescribed rotation speed threshold value. In addition, even if the malfunction does not occur during the first control, the malfunction may occur when the control is switched from the first control to the second control in some cases. However, even in this case, the switching is performed in a state where the required rotation speed and the measured rotation speed previously coincide with each other for a predetermined time. Accordingly, it is possible to reduce risks of the malfunction during the switching. In addition, the first control is performed in a shorter period of time after the motor is actuated. In this manner, even in a situation where a refrigerant needs to be compressed at a relatively high pressure when an outside air temperature is high, the second control which is excellent in efficiency can be preferentially performed by giving priority to the second control. Therefore, it is possible to prevent overheating of an IGBT.

In addition, the above-described motor control device may be configured as follows. The motor control device includes a control unit that controls a rotation speed of a motor in accordance with a required rotation speed by performing first control capable of following the required rotation speed or a torque load applied to the motor at every first predetermined time unit, on the motor, or by performing second control capable of following the required rotation speed or the torque load at every second predetermined time unit which is longer than the first predetermined time unit in the first control, on the motor, and a switching determination unit that switches from the first control to the second control, in a case where a rotation speed measured value of the motor exceeds a prescribed rotation speed threshold value. The switching determination unit further switches from the first control to the second control, in a case where the rotation speed measured value is equal to or smaller than the rotation speed threshold value, and in a case where a prescribed time elapses from when the rotation speed measured value coincides with the required rotation speed.

According to this configuration, for example, in a case where the first control is control in which it is possible to perform the highly precise control by following a fluctuation in the required rotation speed or a torque load applied to the motor in units of microseconds and the second control is control that can follow the fluctuation or the torque load in units of milliseconds, it is possible to relatively advance the point in time for switching from the first control to the second control. That is, even in a situation where the above-described factors of the malfunction may occur, the first control is switched to the second control which is not sensitive to the fluctuation in the required rotation speed without waiting for the rotation speed measured value of the motor to exceed the prescribed rotation speed threshold value. In this manner, the motor can be prevented beforehand from being stopped as in the malfunction.

In addition, in the above-described motor control device, the switching determination unit may further switch from the first control to the second control, in a case where a fluctuation in the required rotation speed is equal to or greater than a prescribed fluctuation threshold value.

According to this configuration, the fluctuation in the required rotation speed that causes the malfunction is directly set as a switching condition. Therefore, it is possible to more reliably prevent the malfunction.

In addition, the above-described motor control device may further include a torque correlation parameter acquisition unit that acquires a parameter correlated with a torque to be output by the motor. The switching determination unit may switch from the first control to the second control, in a case where the torque estimated based on the acquired parameter exceeds a torque threshold value.

According to this configuration, an increase in the torque load that causes the malfunction is directly set as a switching condition. Therefore, it is possible to more reliably prevent the malfunction.

In addition, in the above-described motor control device, the prescribed time may be one second.

According to this configuration, it is possible to perform switching sufficiently earlier before the required rotation speed or a steady high torque load applied to the motor affects the motor control. Therefore, it is possible to more reliably prevent the malfunction.

According to the present invention, there is provided a motor control method including a step of controlling a rotation speed of a motor in accordance with a required rotation speed by performing first control which enables precise control on the motor, or by performing second control which enables higher efficient control than the first control on the motor, and a step of switching from the first control to the second control, in a case where a rotation speed measured value of the motor exceeds a prescribed rotation speed threshold value. In the step of switching from the first control to the second control, the first control is further switched to the second control, in a case where the rotation speed measured value is equal to or smaller than the rotation speed threshold value, and in a case where a prescribed time elapses from when the rotation speed measured value coincides with the required rotation speed.

According to the present invention, there is provided an electric compressor including the above-described motor control device.

According to the present invention, there is provided a vehicle air conditioner including the above-described electric compressor.

According to the present invention, there is provided a motor control program for causing a computer to execute the above-described motor control method.

Advantageous Effects of Invention

According to the motor control device, the electric compressor including the same, the vehicle air conditioner, the motor control method, and the motor control program which are described above, the malfunction of the motor is prevented. In this manner, it is possible to improve reliability of the motor control device, the electric compressor including the same, and the vehicle air conditioner.

DESCRIPTION OF EMBODIMENTS

First Embodiment

Hereinafter, a motor control method for an electric compressor according to a first embodiment of the present invention will be described with reference to FIGS. 1 to 6.

Figure 1:
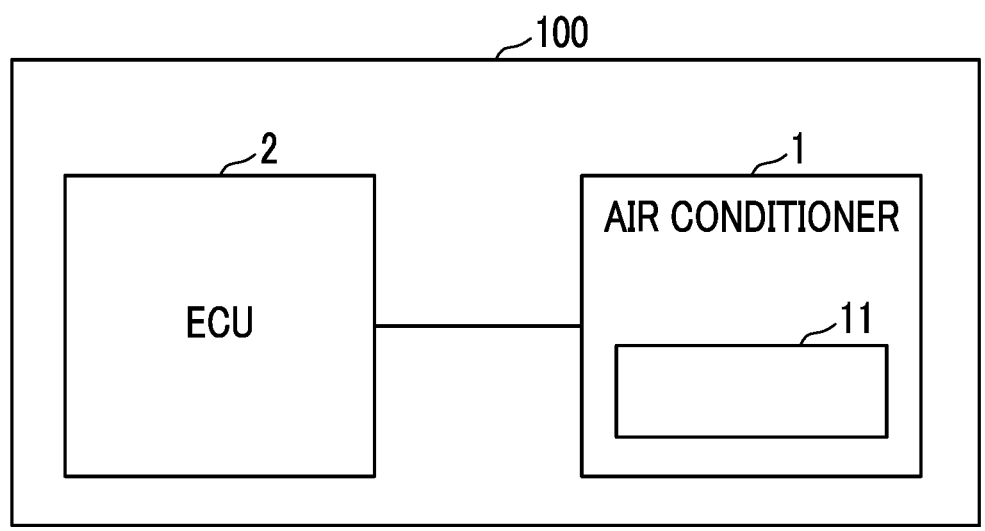
FIG. 1 is a schematic block diagram of a vehicle serving as a vehicle on which an air conditioner including an electric compressor having a motor control device according to a first embodiment of the present invention is mounted.

FIG. 1 is a schematic block diagram of a vehicle 100 serving as a vehicle on which an air conditioner 1 including an electric compressor 11 having a motor control device 51 according to the first embodiment of the present invention is mounted.

FIG. 1 illustrates an electric control unit (ECU) 2 and the in-vehicle air conditioner 1 mounted on a vehicle 100. As illustrated, the vehicle 100 includes the ECU 2 and the air conditioner 1. In addition, the air conditioner 1 includes the electric compressor 11. The ECU 2 controls electric devices of the vehicle 100. The air conditioner 1 is a vehicle air conditioning unit. The electric compressor 11 is used for the in-vehicle air conditioner. The electric compressor 11 is an inverter-integrated electric compressor in which an inverter device 41 is incorporated. The ECU 2 and the air conditioner 1 are connected to each other by a signal line, a communication line, and a power line. The air conditioner receives a control signal of the ECU 2 through controller area network (CAN) communication, and performs a user's desired operation. For example, when the user performs an operation for starting an operation of the air conditioner, the ECU 2 outputs a control signal corresponding to the operation of the user to the air conditioner 1, and the air conditioner 1 starts the operation, based on the control signal. In addition, when the user sets a temperature inside the vehicle, the ECU 1 generates a control signal corresponding to the set temperature, and controls an operating state of the air conditioner 2.

Figure 2:
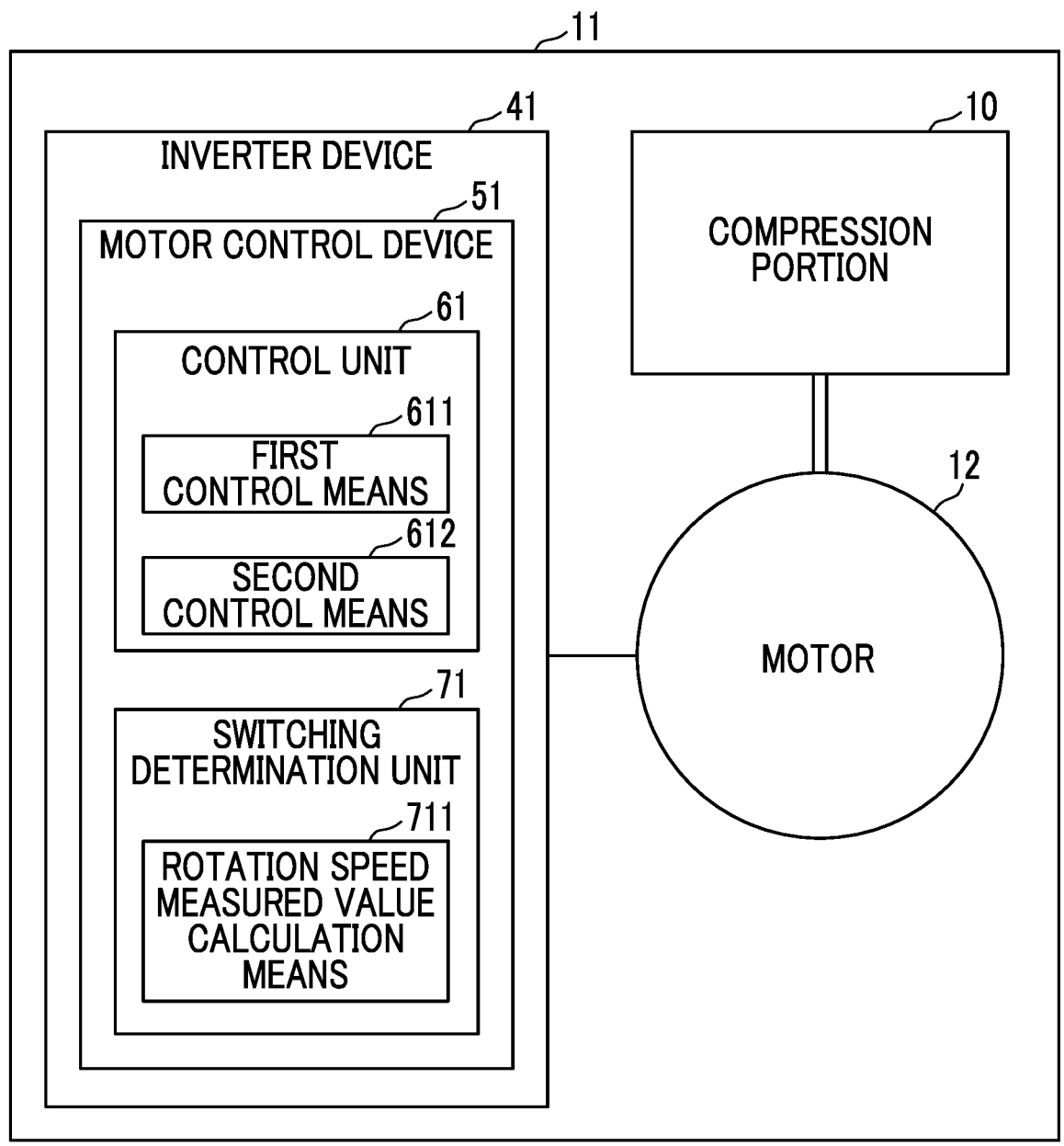
FIG. 2 is a schematic block diagram of the electric compressor having the motor control device according to the first embodiment of the present invention.
Figure 3:
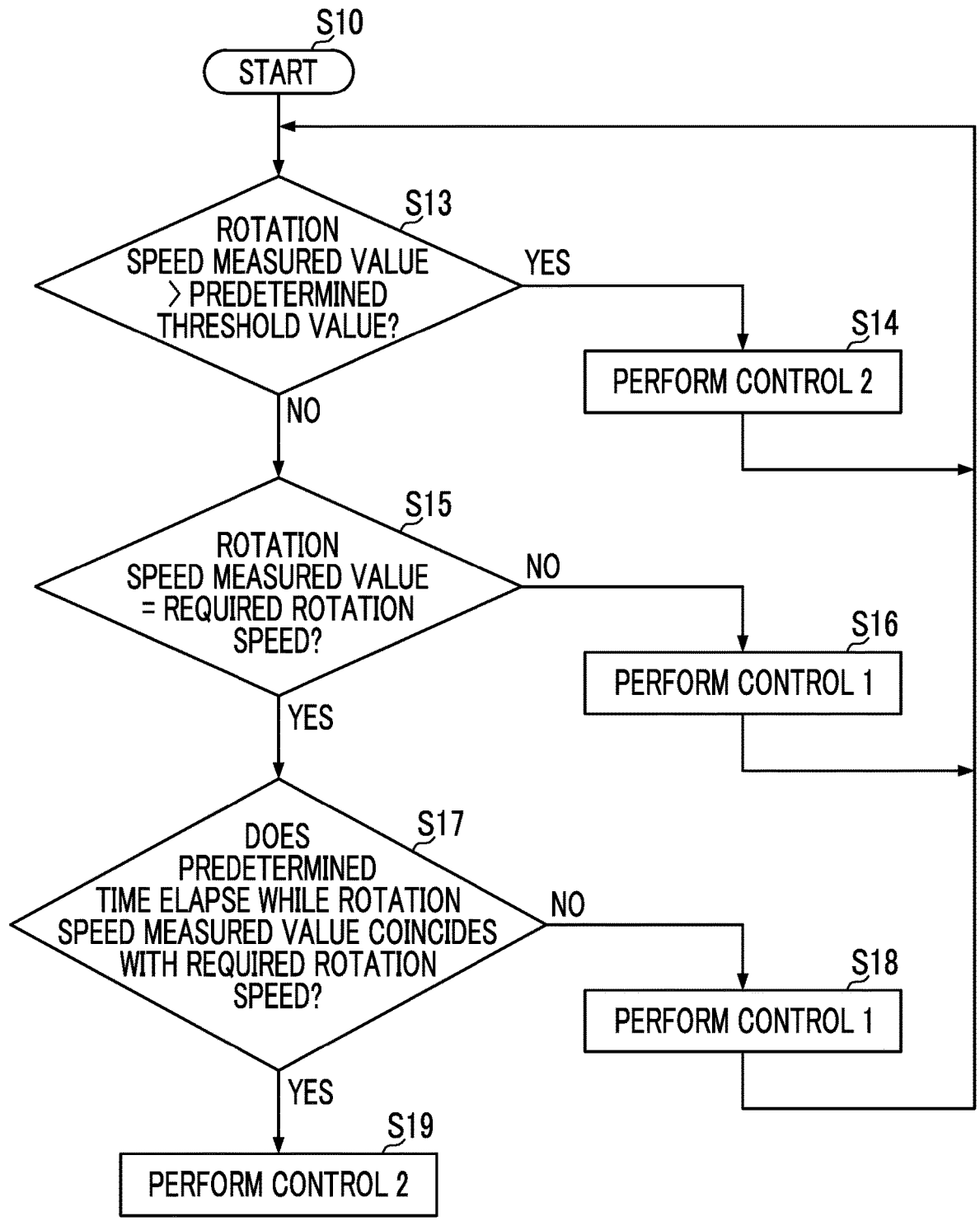
FIG. 3 is a flowchart illustrating an example of motor control according to the first embodiment of the present invention.

FIG. 2 is a schematic block diagram of the electric compressor 11 having the motor control device 51 according to the first embodiment of the present invention. The electric compressor 11 is an inverter-integrated electric compressor, and has an inverter device 41, a motor 12, and a compression portion 10.

The inverter device 41 converts DC power supplied from a power source (not illustrated) such as a battery into three-phase AC, and supplies the three-phase AC to the motor 12. The motor 12 obtaining the power rotates and transmits a rotational force to the compression portion 10 that is mechanically connected to the motor 12. The compression portion 10 receiving the rotational force supplies a refrigerant to a refrigerant circuit (not illustrated) included in the air conditioner 1.

The inverter device 41 has the motor control device 51. The motor control device 51 has a control unit 61 and a switching determination unit 71.

The control unit 61 has first control means 611 for performing Control 1 and second control means 612 for performing Control 2. In the present embodiment, the first control means 611 performs control (hereinafter, referred to as Control 1) that has a weak point in a highly efficient and wide range operation although the control enables a high torque and highly precise operation. Therefore, the control is suitable for driving the motor at low speed and high torque, and is particularly effective in a case where a high starting torque is required. Therefore, the motor control device 51 according to the present embodiment performs Control 1 when the motor 12 is actuated. That is, when a user performs an operation for starting the operation of the air conditioner, the ECU 1 outputs a control signal corresponding to the operation to the air conditioner 1. In response to the signal, the air conditioner 1 uses the first control means 611. The motor 12 starts to be driven through inverter control controlled by the control unit 61.

In addition, a voltage in Control 1 according to the present embodiment is calculated in units of microseconds. Accordingly, Control 1 can sensitively follow the required rotation speed. Therefore, a highly precise motor operation can be performed.

On the other hand, in the present embodiment, the second control means 612 performs control (hereinafter, referred to as Control 2) that enables the highly efficient and wide range operation although the control has the weak point in the high torque and highly precise operation. In addition, Control 2 according to the present embodiment is calculated in units of milliseconds. Accordingly, Control 2 has an advantage in that the control has a strong point in coping with a sudden fluctuation without sensitively and excessively following the required rotation speed. Therefore, Control 2 enables the highly efficient and wide range operation. Therefore, the motor control device 51 according to the present embodiment first performs Control 1 after the motor 12 is actuated, and subsequently, the control is switched to Control 2.

Next, the switching determination unit 71 will be described in detail. The switching determination unit 71 has rotation speed measured value calculation means 711.

The switching determination unit 71 according to the present embodiment determines whether to switch from Control 1 to Control 2, and transmits a switching signal to the control unit 61 in a case where switching conditions are satisfied. As one of the conditions, there is a case where the rotation speed measured value exceeds a predetermined threshold value. The switching determination unit 71 according to the present embodiment compares a rotation speed measured value obtained from the rotation speed measured value calculation means 711 with a predetermined threshold value. As an example, the predetermined threshold value is 2,000 rpm. In this case, the control is forcibly switched regardless of other conditions. That is, after the user starts to operate the air conditioner, when the motor 12 reaches the rotation speed having a predetermined threshold value or greater, the switching determination unit 71 commands the control unit 61 to switch the control to Control 2. In accordance with the command, the control unit 61 drives the electric compressor by using Control 2.

As described above, the motor control device 51 according to the present embodiment performs the control and the switching which utilize each advantage of two types of the control. In this manner, the electric compressor is operated by efficiently driving the motor while a desired operation effect is achieved.

Here, the switching determination unit 71 according to the present embodiment has a condition for the switching even in a case where the rotation speed measured value is equal to or smaller than the above-described predetermined threshold. More specifically, the switching determination unit 71 performs the switching even in a case where a prescribed time elapses from when the required rotation speed which is the rotation speed corresponding to a frequency of the power supplied to the motor 12 and the rotation speed measured value obtained from the above-described rotation speed measured value calculation means 711 coincide with each other.

The prescribed time is one second, for example.

Next, a flow of control switching in the motor control device 51 of the electric compressor according to the present embodiment will be described.

Figure 4:
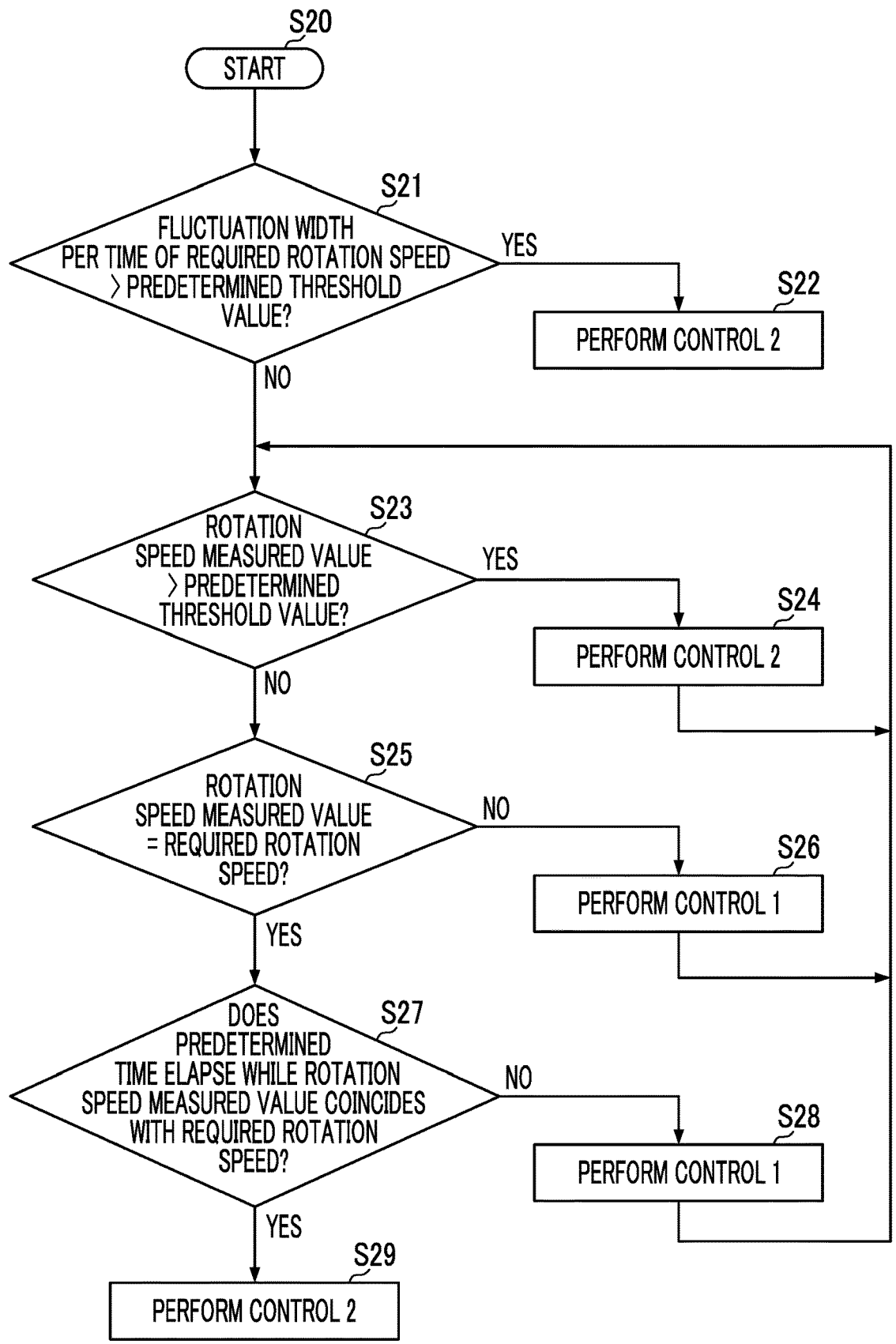
FIG. 4 is a flowchart illustrating an example of motor control according to a second embodiment of the present invention.
Figure 5:
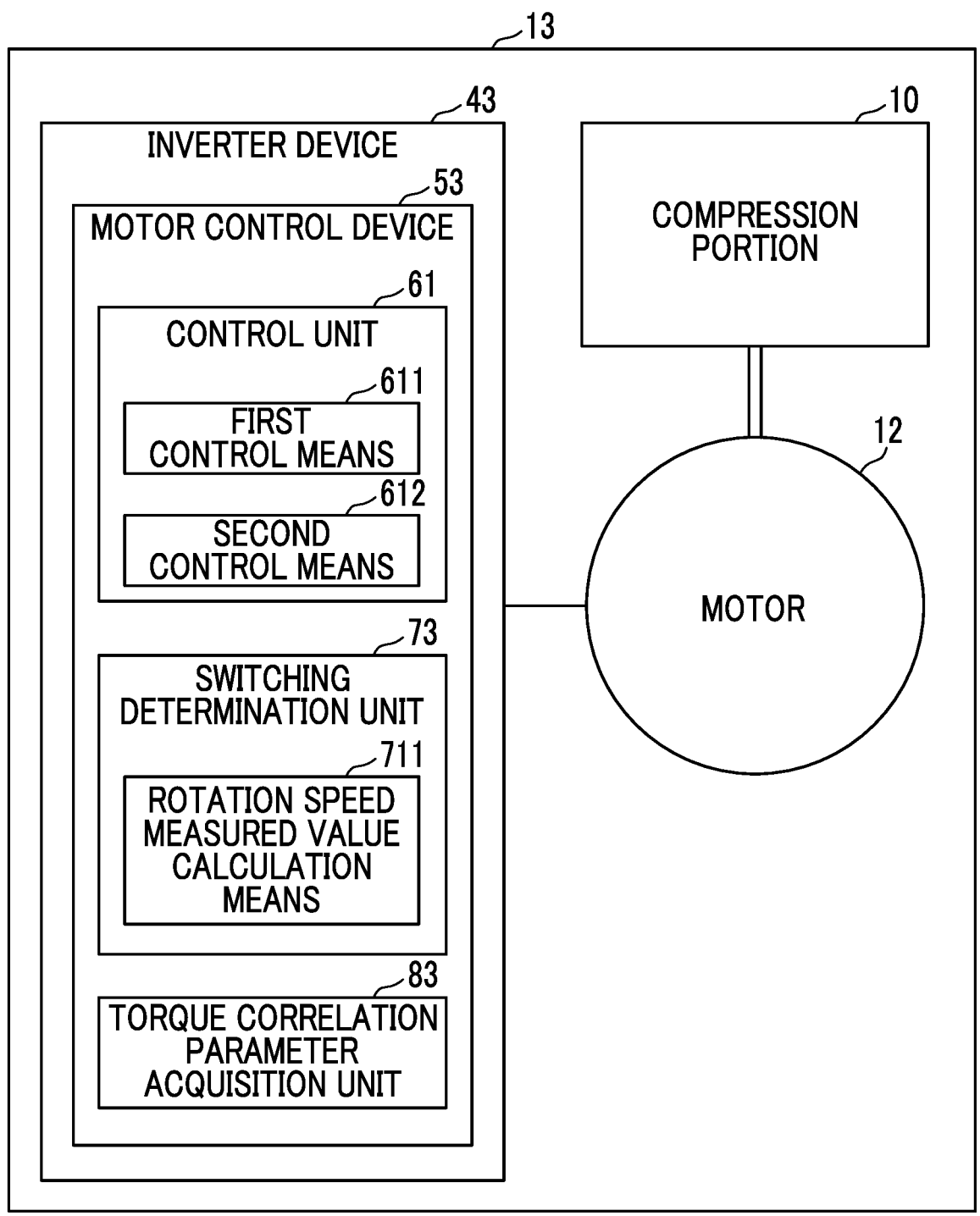
FIG. 5 is a schematic block diagram of an electric compressor having a motor control device according to a third embodiment of the present invention.

FIG. 4 is a flowchart illustrating an example of the control switching in the motor control device 51 of the electric compressor according to the embodiment of the present invention.

First, a determination unit compares the rotation speed measured value obtained from the rotation speed measured value calculation means 711 with the predetermined threshold (Step S13). In a case where the rotation speed measured value exceeds the predetermined threshold value (Step S13; Yes), Control 2 is forcibly performed (Step S14). On the other hand, in a case where the rotation speed measured value does not exceed the predetermined threshold value (Step S13; No), the determination unit subsequently determines whether the rotation speed measured value coincides with the required rotation speed (Step S15). In a case where the rotation speed measured value does not coincide with the required rotation speed (Step S15; Yes), Control 1 is performed (Step S16). In a case where the rotation speed measured value coincides with the required rotation speed (Step S15; Yes), the determination unit subsequently compares a time during which the rotation speed measured value coincides with the required rotation speed, with a predetermined time (Step S17). As a result of the comparison, in a case where the time during which the rotation speed measured value coincides with the required rotation speed does not exceed the predetermined time (Step S17; No), Control 1 is continuously performed (Step S18). When the time exceeds the predetermined time (Step S17; Yes), Control 2 is performed (Step S19).

In the motor control device 51 having the above-described configuration, in a case where Control 1 is switched to Control 2, and in a case where the time coincides with the predetermined time while the rotation speed measured value coincides with the required rotation speed, even if the rotation speed measured value does not exceed the threshold value determined by the rotation speed, Control 2 is performed. In this manner, for example, it is possible to prevent a malfunction in a case where two types of motor control methods are switched therebetween when the motor 12 of the electric compressor is actuated. According to the present embodiment, it is possible to relatively quicken timing for switching from Control 1 that has a weak point in a highly efficient and wide range operation although the control enables a high torque and highly precise operation, to Control 2 that enables the highly efficient and wide range operation although the control has the weak point in the high torque and highly precise operation. That is, even in a situation where the above-described factors of the malfunction (such as a steady increase in the torque load or a sudden fluctuation in the required rotation speed) may occur, Control 1 is switched to Control 2 which is not sensitive to the fluctuation in the required rotation speed and enables a wider range operation without waiting for the timing at which the rotation speed measured value of the motor 12 exceeds the prescribed rotation speed threshold value. In addition, even if the malfunction does not occur during Control 1, the malfunction may occur when the control is switched from Control 1 to Control 2 in some cases. However, even in this case, the switching is performed in a state where the required rotation speed and the measured rotation speed previously coincide with each other for a predetermined time. Accordingly, it is possible to reduce risks of the malfunction during the switching. In this manner, it is possible to prevent a control circuit from being adversely affected by spike current generation. In addition, Control 1 is performed in a shorter period of time after the motor is actuated. In this manner, even in a situation where a refrigerant needs to be compressed at a relatively high pressure when an outside air temperature is high, Control 2 which is excellent in efficiency can be preferentially performed by giving priority to Control 2. Therefore, it is possible to prevent overheating of an IGBT.

Therefore, the motor control device 51, the electric compressor 11 including the same, and the vehicle air conditioner 1 according to the present embodiment can obtain higher reliability.

Second Embodiment

Next, a second embodiment will be described. In the second embodiment, different processes are performed by configuration elements which are the same as those according to the first embodiment. Hereinafter, a flow of control switching in a motor control device 52 of the electric compressor according to the present embodiment will be described with reference to FIG. 4.

In the present embodiment, a process performed by a switching determination unit 72 is different from that according to the first embodiment. Specifically, as a prior stage of using rotation speed measured value calculation means 711 belonging to the switching determination unit 72, the fluctuation in the required rotation speed is tracked, and a fluctuation width per time is compared with a predetermined threshold value (Step S21). As a result, in a case where the fluctuation width of the required rotation speed is greater than the predetermined threshold value, the control is switched to Control 2 without using the rotation speed measured value calculation means 711 (Step S21; Yes). On the other hand, in a case where fluctuation width of the required rotation speed is smaller than the predetermined threshold value (Step S21; No), the process proceeds to the comparison between the rotation speed measured value and the predetermined threshold value by using the rotation speed measured value calculation means 711 (Step S23). The flow from Steps S23 to S29 which are the steps subsequent to this procedure is the same as the flow from Steps S13 to S19 in the first embodiment. In the present embodiment, as an example, after reaching Steps S24, S26, and S28, the process returns to Step S23 corresponding to Step S13 in the first embodiment. However, the process may return to Step S21.

In the motor control device 52 having the above-described configuration, in a case where the control is switched from Control 1 to Control 2, the control can be switched to Control 2 in a case where the required rotation speed sharply fluctuates regardless of the rotation speed measured value. That is, the fluctuation in the required rotation speed that causes the malfunction is directly set as a switching condition.

For example, as in the first embodiment, in a case where Control 1 has the weak point in the highly efficient and wide range operation although the control enables the high torque and highly precise operation, and Control 2 enables the highly efficient and wide range operation although the control has the weak point in the high torque and highly precise operation, when the required rotation speed sharply fluctuates during Control 1, the control tries to sensitively follow the required rotation speed. As a result, there is an increasing possibility that the malfunction may occur. Therefore, the sharp fluctuation in the required rotation speed is detected, and the control is switched to Control 2 in response to a detection result thereof. In this manner, it is possible to prevent the malfunction from occurring. In this manner, the malfunction of the motor 12 can be prevented beforehand. In this manner, it is possible to prevent a control circuit from being adversely affected by spike current generation.

Therefore, the motor control device 52, the electric compressor 12 including the same, and the vehicle air conditioner 2 according to the present embodiment can obtain higher reliability.

Third Embodiment

Figure 6:
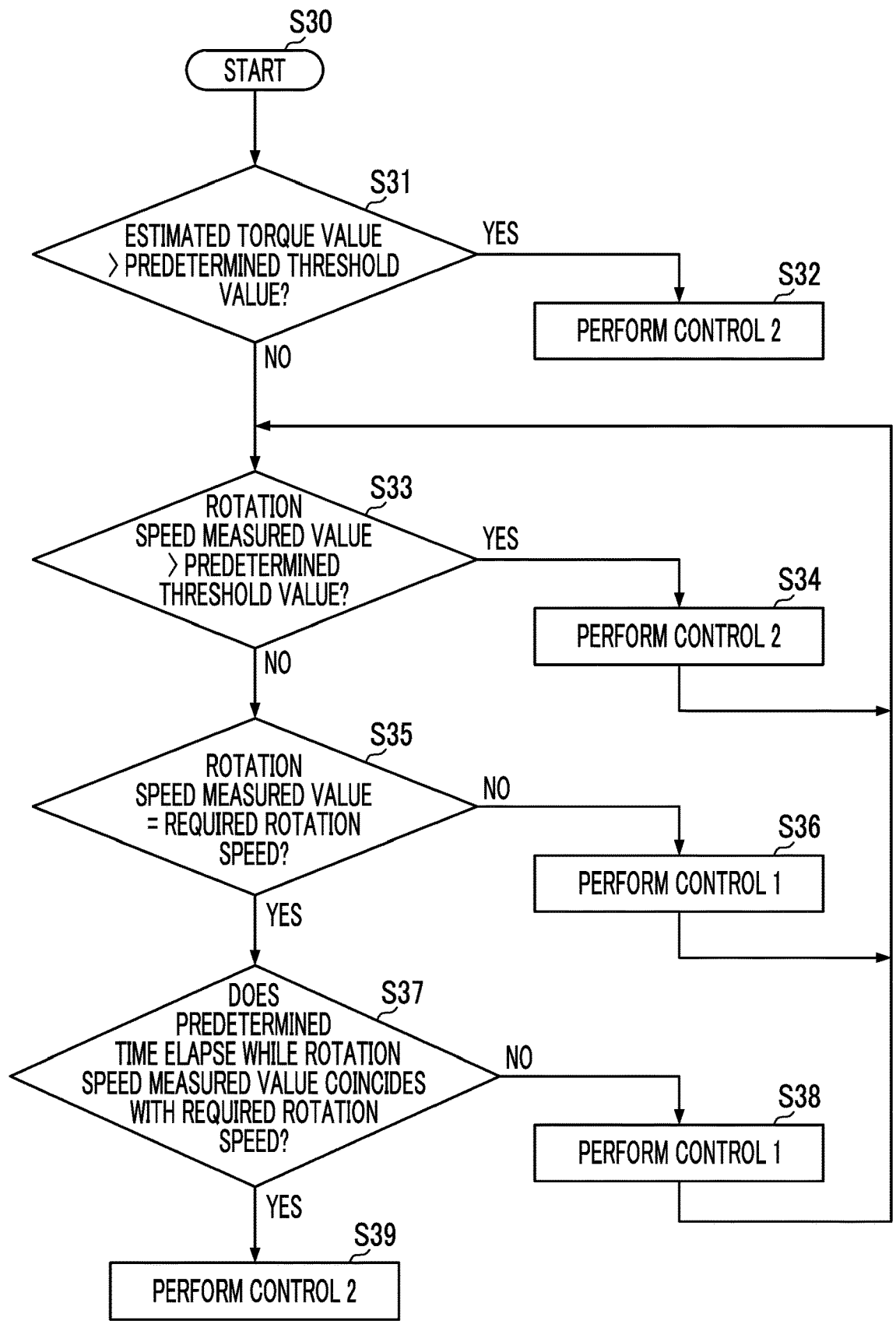
FIG. 6 is a flowchart illustrating an example of motor control according to the third embodiment of the present invention.

Next, a third embodiment of the present invention will be described with reference to FIG. 6. In the second embodiment, the same reference numerals will be assigned to configuration elements which are the same as those according to the first embodiment, and detailed description thereof will be omitted.

The third embodiment is different from the first embodiment in a configuration of a switching determination unit 73. In the present embodiment, the switching determination unit 73 further includes a torque correlation parameter acquisition unit.

The torque correlation parameter acquisition unit acquires a parameter indicating a correlation with a torque generated by the motor 12. In the present embodiment, for example, a current value of the motor 12 is acquired, and a torque value of the motor 12 is estimated.

Even in the present embodiment, as in the second embodiment, a process performed by the switching determination unit 73 is different from that according to the first embodiment. Specifically, as a prior stage of using the rotation speed measured value calculation means 711 belonging to the switching determination unit 73, the control is switched to Control 2 in a case where an estimated torque value calculated by the above-described torque correlation parameter acquisition unit 83 exceeds a predetermined threshold value.

Hereinafter, a flow of control switching in a motor control device 53 of the electric compressor according to the present embodiment will be described with reference to FIG. 4.

In the present embodiment, the process performed by the switching determination unit 71 is different from those according to the first embodiment and the second embodiment. Specifically, as a prior stage of using the rotation speed measured value calculation means 711 belonging to the switching determination unit 71, the estimated torque value calculated by the torque correlation parameter acquisition unit is compared with the predetermined threshold value (Step S31). As a result, in a case where the estimated torque value is greater than the predetermined threshold value, the control is switched to Control 2 without using the rotation speed measured value calculation means 711 (Step S31; Yes). On the other hand, in a case where the estimated torque value is smaller than the predetermined threshold (Step S31; No), the process proceeds to the comparison between the rotation speed measured value and the predetermined threshold value by using the rotation speed measured value calculation means 711 (Step S33). The procedure subsequent to this procedure is the same as that according to the first embodiment. The flow from Steps S33 to S39 which are the steps subsequent to this procedure is the same as the flow from Steps S13 to S19 in the first embodiment. In the present embodiment, as an example, after reaching Steps S34, S36, and S38, the process returns to Step S33 corresponding to Step S13 in the first embodiment. However, the process may return to Step S31.

In the motor control device 53 having the above-described configuration, in a case where the control is switched from Control 1 to Control 2, the control can be switched to Control 2 in a case where it is estimated that the motor 12 outputs a high torque regardless of the rotation speed measured value. That is, an increase in the torque load that causes the malfunction is directly set as the switching condition.

For example, as in the first embodiment, in a case where Control 1 has the weak point in the highly efficient and wide range operation although the control enables the high torque and highly precise operation, and Control 2 enables the highly efficient and wide range operation although the control has the weak point in the high torque and highly precise operation, the control can be switched early to Control 2 that enables the wider range control. Control 1 can output a higher torque than Control 2 in general. However, when a vehicle air conditioner starts in a state where the outside air temperature is abnormally high, a state where a high torque needs to be output may be steady in some cases. In this case, if Control 1 is continuously performed for a long period of time, there is a concern that the malfunction may occur. Therefore, the control is switched to Control 2 early. In this manner, although the torque output is reduced, it is possible to prevent the control circuit from being adversely affected by the spike current generation.

Therefore, the motor control device 53, the electric compressor 13 including the motor control device 53, and the vehicle air conditioner 3 according to the present embodiment can achieve higher reliability.

In any of the above-described embodiments, any specific control method may be adopted. However, as an example of the first control (Control 1), sensor-less vector control may be used. As an example of the second control (Control 2), V/f control may be used.

A case where the electric compressors 11 and 13 configure a part of the vehicle air conditioner of the vehicle 100 has been described as an example. However, the motor control devices 51 and 53 and the electric compressors 11 and 13 according to the present embodiment are also applicable to an air conditioner of a chiller/refrigerator vehicle. In addition, an applicable device of the motor control devices 51 and 53 and the electric compressor 11 according to the present embodiment may be an air conditioner mounted on various vehicles such as a ship, an aircraft, and a railway system, in addition to the vehicle 100.

INDUSTRIAL APPLICABILITY

According to the motor control device, the electric compressor including the same, the vehicle air conditioner, the motor control method, and the motor control program which are described above, the malfunction of the motor is prevented. In this manner, it is possible to improve reliability of the motor control device, the electric compressor including the same, and the vehicle air conditioner.

REFERENCE SIGNS LIST

2: ECU
1, 3: air conditioner
100: vehicle
11: electric compressor
41, 43: inverter device
10: compression portion
12: motor
51, 53: motor control device
61: control unit
71, 73: switching determination unit
611: first control means
612: second control means
711: rotation speed measured value calculation means
83: torque correlation parameter acquisition unit

The invention claimed is:
1. An electric compressor comprising:
a motor control device comprising:
a control unit that controls a rotation speed of a motor in accordance with a required rotation speed by performing first control which enables high torque and precise control on the motor, or by performing second control which enables higher efficient control than the first control on the motor; and
a switching determination unit that switches from the first control to the second control, in a case where a rotation speed measured value of the motor exceeds a prescribed rotation speed threshold value,
wherein the switching determination unit further switches from the first control to the second control, in a case where the rotation speed measured value is equal to or smaller than the rotation speed threshold value and a prescribed time elapses with the rotation speed measured value coinciding with the required rotation speed, wherein both of the first control and second control are inverter control.

2. The electric compressor according to claim 1, wherein the switching determination unit further switches from the first control to the second control, in a case where a fluctuation in the required rotation speed is equal to or greater than a prescribed fluctuation threshold value.

3. The electric compressor according to claim 1, further comprising:

a torque correlation parameter acquisition unit that acquires a parameter correlated with a torque to be output by the motor, wherein the switching determination unit switches from the first control to the second control, in a case where the torque estimated based on the acquired parameter exceeds a torque threshold value.

4. The electric compressor according to claim 1, wherein the prescribed time is one second.

5. The electric compressor according to claim 2, wherein the prescribed time is one second.

6. The electric compressor according to claim 3, wherein the prescribed time is one second.

7. An electric compressor comprising:

a motor control device comprising:

a control unit that controls a rotation speed of a motor in accordance with a required rotation speed by performing first control capable of following the required rotation speed or a torque load applied to the motor at every first predetermined time unit, on the motor, or by performing second control capable of following the required rotation speed or the torque load at every second predetermined time unit which is longer than the first predetermined time unit in the first control, on the motor; and a switching determination unit that switches from the first control to the second control, in a case where a rotation speed measured value of the motor exceeds a prescribed rotation speed threshold value, wherein the switching determination unit further switches from the first control to the second control, in a case where the rotation speed measured value is equal to or smaller than the rotation speed threshold value and a prescribed time elapses with the rotation speed measured value coinciding with the required rotation speed, wherein both of the first control and second control are inverter control.

8. The electric compressor according to claim 7, wherein the switching determination unit further switches from the first control to the second control, in a case where a fluctuation in the required rotation speed is equal to or greater than a prescribed fluctuation threshold value.

9. The electric; compressor according to claim 7, further comprising:

a torque correlation parameter acquisition unit that acquires a parameter correlated with a torque to be output by the motor, wherein the switching determination unit switches from the first control to the second control, in a case where the torque estimated based on the acquired parameter exceeds a torque threshold value.

10. The electric compressor according to claim 7, wherein the prescribed time is one second.

11. A motor control method comprising:

a step of controlling a rotation speed of a motor in accordance with a required rotation speed by performing first control which enables high torque and precise control on the motor, or by performing second control which enables higher efficient control than the first control on the motor; and a step of switching from the first control to the second control, in a case where a rotation speed measured value of the motor exceeds a prescribed rotation speed threshold value, wherein in the step of switching from the first control to the second control, the first control is further switched to the second control, in a case where the rotation speed measured value is equal to or smaller than the rotation speed threshold value and a prescribed time elapses with the rotation speed measured value coinciding with the required rotation speed, and wherein both of the first control and second control are inverter control.

12. A non-transitory computer-readable medium that stores a program for causing a computer to execute a process comprising:

a step of controlling a rotation speed of a motor in accordance with a required rotation speed by performing first control which enables high torque and precise control on the motor, or by performing second control which enables higher efficient control than the first control on the motor; and a step of switching from the first control to the second control, in a case where a rotation speed measured value of the motor exceeds a prescribed rotation speed threshold value, wherein in the step of switching from the first control to the second control, the first control is further switched to the second control, in a case where the rotation speed measured value is equal to or smaller than the rotation speed threshold value and a prescribed time elapses with the rotation speed measured value coinciding with the required rotation speed, and wherein both of the first control and second control are inverter control.

* * * * *